May 17, 1960     D. A. ROGERS, JR     2,937,230
RESINOUS REACTION PRODUCTS OF UNSATURATED POLYESTERS
ORGANOPOLYSILOXANES, AND UNSATURATED MONOMERS AND
ELECTRICAL MEMBERS INSULATED THEREWITH
Filed May 28, 1954

WITNESSES:
E.A. McCloskey.
William G. Addison

INVENTOR
Dow A. Rogers, Jr.
BY
Frederick Shapoe
ATTORNEY

United States Patent Office 2,937,230
Patented May 17, 1960

2,937,230

RESINOUS REACTION PRODUCTS OF UNSATURATED POLYESTERS ORGANOPOLYSILOXANES, AND UNSATURATED MONOMERS AND ELECTRICAL MEMBERS INSULATED THEREWITH

Dow A. Rogers, Jr., Pittsburgh, Pa., assignor to Westinghouse Electric Corporation, East Pittsburgh, Pa., a corporation of Pennsylvania Application May 28, 1954, Serial No. 432,962

6 Claims. (Cl. 174—121)

The present invention relates to resinous materials and has particular reference to completely reactive synthetic copolymer resinous compositions containing organopolysiloxanes.

Resinous materials used as insulation for electrical apparatus and in the preparation of molded and cast articles should have high mechanical strength and should be heat stable at the temperatures frequently encountered in the use of such apparatus and articles. With respect to electrical apparatus, for example, the resinous material applied thereto to be completely satisfactory as an insulation should, among other things, be relatively flexible in order to withstand normal expansion and contraction strains and wear and tear, should withstand thermal shock, should have a high dielectric strength, and should undergo little, if any, decomposition during high temperature operation of the apparatus.

Heretofore, various kinds of resinous materials have been proposed for application as insulation for electrical apparatus. Polyester resins, for example, have been employed with varying degrees of success. However, polyester resins, in general, do not have as satisfactory thermal stability as is desired at the elevated temperatures frequently encountered in the use of such apparatus. Silicone resins, on the other hand, have excellent thermal stability but they do not have as satisfactory mechanical strength as the polyester resins at elevated temperaures. Some commercially used silicone resins, for example, are relatively hard and rigid and have satisfactory mechanical strength at room temperatures but soften and become jelly-like on heating to the maximum temperatures of use of certain electrical equipment.

Attempts have been made to blend certain polyester and silicone resins in an effort to realize the optimum desirable properties and characteristics of each in a single mixed resinous product. Such attempts have not been completely satisfactory, however, because of the inherent incompatibility of polyester resins with silicone resins.

The object of the present invention is to provide completely reactive synthetic copolymer resinous compositions embodying organopolysiloxane groups, which have exceptionally high thermal stability and particularly good mechanical strength characteristics even at elevated temperatures.

Another object of the invention is to provide for applying to electrical apparatus completely reactive synthetic copolymer resinous compositions embodying organopolysiloxane groups, which compositions, when so applied, provide insulating material therefor having outstanding physical and electrical properties.

To indicate more fully the advantages and capabilities of the present invention, together with other and further objects thereof, reference is made to the following description taken in conjunction with the accompanying drawing wherein.

Figure 1:
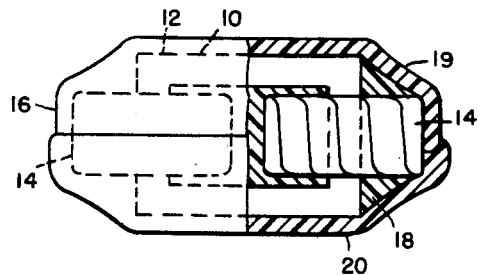
Fig. 1 is an elevation view, partly in cross-section, showing a transformer impregnated with and encapsulated within the compositions of this invention.

It will be understood that embodiments of the invention, other than those illustrated and described, employing the same or equivalent principles may be used, and that structural changes may be made as desired without departing from the true scope of the invention.

Broadly, the completely reactive synthetic copolymer resinous compositions of this invention comprise (A) from 50% to 80% by weight of a product obtained by reacting (a) an organopolysiloxane having at least two hydrolyzable hydrocarbonoxy radicals per molecule, said radicals being located on the terminal silicon atoms of the organopolysiloxane and all of the other organic substituents on the silicon atoms being hydrocarbon groups, with (b) an unsaturated polyester containing at least as many reactive alcoholic hydroxyl groups as there are hydrolyzable hydrocarbonoxy radicals on the terminal silicon atoms of the organopolysiloxane, and (B) 50% to 20% by weight of at least one liquid, unsaturated reactive monomer having the group $>C=C<$.

The organopolysiloxanes (referred to hereinafter, for convenience, as "siloxanes") used in preparing the compositions of this invention include those materials having the recurring structural unit Si-O-Si. Suitable siloxanes include only those having at least two hydrolyzable hydrocarbonoxy radicals, represented by the general formula RO-, per molecule, with at least one of said radicals being located on each of the terminal silicon atoms of the siloxane molecule. The hydrolyzable hydrocarbonoxy radicals comprise material selected from the group consisting of alkoxy and aryloxy groups. When RO- is an alkoxy group, the alkyl radical R may be either primary, secondary or tertiary, for example, methyl, ethyl, butyl, isopropyl, isobutyl, secondary butyl, tertiary butyl, amyl, hexyl, and the like. When RO- is an aryloxy group, the aryl radical R may be a phenyl group or a substituted phenyl group. It is preferred to use those siloxanes in which the hydrolyzable radical is an alkoxy group in which the alkyl radical is primary and contains from 1 to 8 carbon atoms per molecule.

The organopolysiloxanes employed in the practice of the present invention may be prepared by any of several methods known in the art. One convenient method comprises hydrolyzing a dialkoxy silane in which the two remaining valences of the silicon atom are satisfied by nonhydrolyzable hydrocarbon radicals. In carrying out the hydrolysis, $n$ mols of siloxane are reacted with $n-1$ mols of water where $n$ is 2 or a greater whole number. The reaction proceeds substantially as follows:

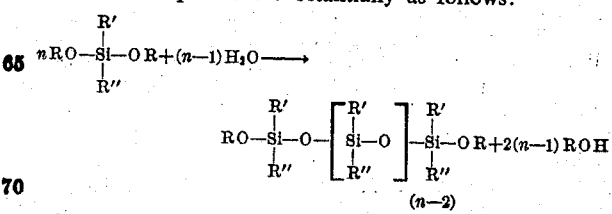

where RO- represents alkoxy groups, R' and R'' are the same or different non-functional, non-hydrolyzable organic radicals, preferably hydrocarbons, and $n$ represents a whole number whose value is at least 2.

Examples of organopolysiloxanes which are suitable for use in accordance with this invention include alkoxypolysiloxanes, for example, methoxy-, ethoxy-, propoxy-, isopropoxy-, butoxy, polysiloxanes and the like; aryl alkoxypolysiloxanes, for example, phenyl, naphthyl, and the like alkoxypolysiloxanes; alkaryl alkoxypolysiloxanes, for example, tolyl, xylyl, and the like alkoxypolysiloxanes; aralkyl alkoxypolysiloxanes, for example, benzyl, phenylethyl, and the like alkoxypolysiloxanes; mixed alkyl and aryl alkoxypolysiloxanes, for example, methyl phenyl, ethyl phenyl, and the like alkoxypolysiloxanes; cycloaliphatic alkoxypolysiloxanes, for example, cyclohexyl alkoxypolysiloxanes; unsaturated aliphatic alkoxypolysiloxanes, for example, vinyl, allyl, and the like alkoxypolysiloxanes. Organopolysiloxanes containing substituted groups or atoms on the organic groups, e.g., halogens, etc., also are within the scope of this invention. A material which has been found to be particularly suitable for use in accordance with this invention is trimethyltriphenyldimethoxytrisiloxane having the structure:

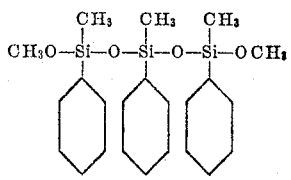

To form the novel silicone modified polyester compositions of this invention, a siloxane of the character just described is reacted with an unsaturated polyester having at least as many reactive alcoholic hydroxyl groups as there are hydrolyzable hydrocarbonoxy radicals on the terminal silicon atoms of the siloxane. The reaction essentially is that of ester interchange. When employing an alkoxypolysiloxane, that material and the polyester are brought together and heated at a temperature within the range of about 130° to 200° C. until alcohol no longer is evolved. An inert gas such as nitrogen, carbon dioxide, or the like may be used to sparge the reaction mixture to aid in carrying off the relatively low-boiling alcohol formed in the reaction. If desired, azeotropic distillation techniques also may be employed.

The silicone modified polyester compositions of this invention comprise materials having the following structure:

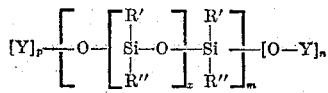

where $R'$ and $R''$ are hydrocarbon radicals, $x$ represents a whole number of from 1 to 7, $m$, $n$, and $p$ each are at least 2, and $Y$ represents the residue of a molecule of an unsaturated hydroxylated polyester with at least two hydroxyl groups removed.

Unsaturated polyesters which are suitable for use in this invention comprise reaction products selected from the group consisting of (1) the ester obtained by reacting at least one material selected from the group consisting of isophthalic acid and terephthalic acid with at least one alpha-beta ethylenically unsaturated dicarboxylic acid and at least one polyhydric alcohol, and (2) the acid half-ester obtained by reacting at least one polyhydric alcohol ester of an hydroxylated unsaturated fatty acid with at least one alpha-beta ethylenically unsaturated dicarboxylic acid and anhydrides thereof.

When the unsaturated polyester selected to be reacted with the siloxane comprises (1) the ester obtained by reacting isophthalic acid or terephthalic acid with an alpha-beta ethylenically unsaturated dicarboxylic acid and a polyhydric alcohol, it is preferred to prepare such an ester by employing a polyhydric alcohol that is sufficiently high-boiling that it will esterify with isophthalic or terephthalic acid, which acids necessitate reaction temperatures in the range of 240°–260° C. for proper esterification. Examples of high-boiling polyhydric alcohols which are particularly suitable for use in accordance with this invention include:

2,2-bis-(para-hydroxyethoxyphenyl)propane;
2,2-bis-(para-hydroxyethoxyethoxyphenyl)propane;
2,2-bis-(para-hydroxypropoxyphenyl)propane;
2,2-bis-(para-hydroxypropoxypropoxyphenyl)propane;
2,2-bis-(para-hydroxyethoxybiphenyl)propane; and the like diphenylols.

When employing such high-boiling alcohols, the resinous polyester materials just described may be prepared in accordance with usual esterification procedures as, for example, by heating the isophthalic or terephthalic acid, alpha-beta ethylenically unsaturated dicarboxylic acid, and polyhydric alcohol under reflux and, if desired, in the presence of an esterification catalyst.

The most complete esterification is obtained when azeotropic distillation procedures are employed to carry off the water formed during the reaction. The removal of water during the esterification may be facilitated by carrying out the esterification in the presence of an organic liquid such as high-boiling naphtha or the like or by passing an inert gas such as nitrogen or carbon dioxide through the reaction mixture.

If desired, lower-boiling polyhydric alcohols may be used in preparing the polyesters in lieu of the high-boiling alcohols described above. When lower-boiling alcohols are used, it is desirable that they be reacted first with a half molar equivalent of an alpha-beta ethylenically unsaturated dicarboxylic acid at a relatively low temperature, 140° to 180° C., after which the resulting polyhydric alcohol half-ester product is reacted with isophthalic or terephthalic acid at higher temperatures, 230° to 260° C., to complete the esterification reaction. Examples of suitable low-boiling polyhydric alcohols which may be employed include ethylene glycol, propylene glycol, neopentalene glycol and the like.

It is essential, when preparing the polyester resinous materials described, that at least one alpha-beta ethylenically unsaturated dicarboxylic acid or anhydrides thereof be employed to supply unsaturated bonds for the polyester for use in copolymerizing the polyesters with the liquid unsaturated reactive monomer, described more fully hereinbelow. Examples of unsaturated dicarboxylic acids and anhydrides thereof which are suitable for this purpose include maleic acid, fumaric acid, itaconic acid, citraconic acid, mesaconic acid, aconitic acid, maleic anhydride and citraconic anhydride. These acids and anhydrides may be used singly or in any desired mixture of two or more.

If desired, the siloxane, in lieu of being reacted with the polyester resin just described, may be reacted with (2) the acid half-ester reaction product obtained upon reacting at least one polyhydric alcohol ester of an hydroxylated unsaturated fatty acid, such as castor oil, with at least one alpha-beta ethylenically unsaturated dicarboxylic acid or anhydride thereof, such as maleic anhydride. As one example of the preparation of such an acid half-ester reaction product the following is given:

About 30 parts by weight of castor oil are admixed with about 10 parts by weight of maleic anhydride, and the mixture is heated at a temperature within the range of about 100° to 140° C. for a period of about two to four hours. The acid half-ester product obtained has a thick molasses-like consistency.

The full acid half-ester is particularly satisfactory for use in accordance with this invention, however, the reaction product of, for example, maleic anhydride and castor oil may be prepared in such proportions that less than all three of the hydroxyl groups in the castor oil are esterified. For example, good results are obtained when an average of two hydroxyl groups per castor oil molecule are esterified, however, an average of at least one hydroxyl group per molecule of castor oil should be esterified.

In preparing the acid half-ester reaction product (b), maleic anhydride is the preferred alpha-beta ethylenically unsaturated dicarboxylic acid because of its availability and high reactivity. However, the simple substituted maleic anhydrides, such for example, as citraconic anhydride, are equally useful and may replace a part or all of the maleic anhydride. Maleic acid, fumaric acid, citraconic acid and the like, however, can easily be reacted, generally with increases in reaction temperatures over those needed with the acid anhydrides.

For the esterification reaction, castor oil is an economical, convenient and readily available hydroxylated unsaturated fatty acid ester of a polyhydric alcohol. The reaction may be carried out by employing the esters of ricinoleic acid with ethylene glycol, propylene glycol, glycerine and other polyhydric alcohols to replace a part or all of the castor oil. In some cases the esters of monohydroxystearic acid and dihydroxystearic acid with polyhydric alcohols can be admixed with the castor oil or its equivalent.

From 50% to 80% by weight of (A) the silicone modified unsaturated polyester prepared as described above then is dissolved in 50% to 20% by weight of (B) a liquid reactive unsaturated monomer having the group $>C=C<$ to yield a fluid resinous composition which will polymerize completely upon heating in the presence of one or more vinyl addition type polymerization catalysts.

Examples of liquid reactive unsaturated monomers having the group $>C=C<$, which are suitable for use in accordance with this invention, include monostyrene, vinyl toluene, alphamethylstyrene, 2,4-dichlorostyrene, paramethyl styrene, vinyl acetate, methyl methacrylate, ethyl acrylate, diallyl phthalate, diallyl succinate, diallyl maleate, methallyl alcohol, acryonitrile, methyl vinyl ketone, diallyl ether, butyl methyacrylate, allyl acrylate, allyl crotonate, 1,3-chloroprene, and divinyl benzene, as well as mixtures of any two or more of these monomers.

Examples of vinyl addition type polymerization catalysts suitable for use in the compositions of this invention include benzoyl peroxide, lauroyl peroxide, methyl ethyl ketone peroxide, t-butyl hydroperoxide, ascaridole, tert-butyl perbenzoate, di-ti-butyl diperphthalate, ozonides, and the like. Such catalysts may be employed in an amount of from 0.1% to 2% by weight, although somewhat larger or smaller amounts may be employed if desired.

Copolymerization of the compositions of this invention can be accelerated further by incorporating in the mixture, along with the catalysts, a small amount, for example, 0.01% to 2% by weight of an accelerator based upon the total weight of the composition. Suitable accelerators are driers such as cobalt naphthenate and the nitrogen-carbon-hydrogen compounds selected from the group consisting of azomethine compounds, polyamino compounds having at least one terminal primary amino group, and the adlehyde reaction products of such compounds.

The polymerizable compositions obtainable in accordance with the present invention usually cannot be stored conveniently in mixed form since polymerization generally will take place even at room temperature within a comparatively short period of time. To overcome or substantially minimize this difficulty it is preferred to incorporate a relatively small proportion of one or more polymerization inhibitors in the mixture comprising the silicone modified polyester and the unsaturated monomer. Polymerization inhibitors which are suitable for this purpose include substituted phenols and aromatic amines. More specific examples of suitable polymerization inhibitors include hydroquinone, resorcinol, tannin, sym. alpha, beta naphthyl diamine, p-phenylene diamine, and the like. The inhibitor preferably is employed in relatively small proportions. Thus, amounts less than about 1.0% may be used, with amounts as small as about 0.01% to about 0.1% generally being sufficient.

The following examples illustrate the preparation of completely reactive synthetic copolymer resinous compositions in accordance with the present invention. The parts given are by weight unless otherwise indicated.

EXAMPLE I

*Part A.*—About 2.5 mols of 2,2-bis-(para-hydroxyethoxyphenyl)propane are placed in a reaction vessel and heated to a temperature of 160° to 170° C. Thereafter about one mol of isophthalic acid is added and the resultant mixture is heated to a temperature of about 250° C. The mixture is held at this temperature for approximately 5 hours, and then is cooled to a temperature of 150° C., whereupon about one mol of maleic anhydride is introduced. The reaction mixture then is heated to 200° C. and held at this temperature for approximately 3 hours.

*Part B.*—The unsaturated polyester resin prepared in Part A is admixed with about 0.53 mols of trimethyltriphenyldimethoxytrisiloxane at about 180° C. and is held at this temperature for 4 hours. The resultant mixture then is cooled to a temperature of about 120° C. and about 0.05 parts of hydroquinone are added. About 80 parts of the resultant mixture then are dissolved in about 20 parts of monostyrene. The resultant mixture is a fluid resinous composition which when admixed with approximately 0.5% by weight of benzoyl peroxide catalyst and subjected to heat or actinic light, or both, polymerizes into a solid, cured thermoset copolymer.

A casting about one-eighth inch thick, two inches long, and one and one-half inches wide was made from a portion of a composition prepared in accordance with the procedure described in Example I. The casting was placed in an aluminum dish of known weight and aged in a constant humidity oven at a temperature of 225° C. At the end of 760 hours the casting had a weight loss of only 14%, indicating its exceptionally high thermal stability characteristics. The casting remained rigid throughout the test and did not puff or crack. It was light yellow in color and transparent prior to the test. After the test, it was found to be amber in color but still transparent. Separate castings of silicone resins and polyester resins, alone, when heated similarly do not exhibit these desirable characteristics. Silicone resins, for example, become somewhat rubbery on heating and ultimately crack, while polyester resins decompose, breaking down to dust-like particles, with a major portion of the product ultimately volatiziling off to the atmosphere.

EXAMPLE II

The same procedure as described in Example I is followed with the exception that terephthalic acid is substituted for isophthalic acid in Part A. The cured resinous copolymer is similarly stable at high temperatures as that of Example I.

EXAMPLE III

The same procedure is followed as described in Example I except that castor oil maleate is employed in place of the base polyester resin described in Part A. The cured resinous product is as thermally stable as that of Example I.

The advantages and capabilities of this invention now will be described and illustrated with reference to the accompanying drawing.

In Fig. 1 thereof there is illustrated a transformer 10 having a core 12 and coils 14. A relatively thick encapsulating layer or coating 16 of the composition of this invention having mica, or other finely divided inorganic flake-like material incorporated therein in an amount sufficient to impart thixotropic properties to the composition, is disposed about the exterior surface of the transformer and cured to a hard resinous capsule. An impregnating material 18, comprising a composition of this invention, completely fills the interstices of the transformer and all voids within the outer layer 16. In this latter instance, mica is not incorporated in the composition since a low viscosity material is desired.

One method for applying the encapsulating and impregnating compositions to the transformer 10 comprises introducing the transformer into a quantity of the mica-containing composition to a depth such that a major proportion of the transformer 10 and the coils 14 are covered. The transformer 10, with a partial coating 19 of the mica-containing composition adhering thereto, then is placed in a baking oven and heated to cause the composition to polymerize into a hard, thermoset material and provide an imperforate layer about a major proportion of the transformer 10 closely conforming to the surface contour thereof. The transformer 10 then is placed in an impregnating tank which is filled with mica-free impregnating composition. The composition will flow into the shell or coating 19 about transformer 10 and penetrate freely and deeply therein, filling all the interstices. The impregnated transformer then is placed in a baking oven where the impregnating composition is caused to polymerize into a solid thermoset impregnate. The partially encapsulated and impregnated transformer 10 then is inverted and positioned in the tank containing the mica-containing composition in such manner that the composition overlaps the origial coating 19. The transformer then is baked whereby the composition polymerizes into a solid thermoset encapsulating layer 20.

Encapsulating procedures other than that described may be carried out using the compositions of this invention. Thus, electrical apparatus also may be encapsulated, using the present compositions, according to the process disclosed in U.S. Serial No. 225,808, co-pending herewith.

Figure 2:
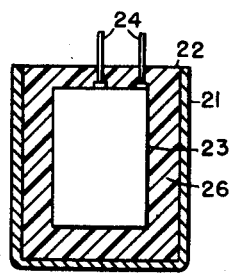
Fig. 2 is a vertical cross-sectional view showing a container in which is positioned a capacitor which is potted with a composition of this invention.

In Fig. 2 there is illustrated a container 21 having an opening 22 therein. An electrical device such as a capacitor 23 is positioned within the container 21 in such manner that its terminals 24 extend through the opening 22. A cured, solid resinous copolymer composition 26 of this invention is introduced into the container 21 to completely surround capacitor 23.

One method for preparing a potted electrical device such as that illustrated in Fig. 2 comprises suspending a capacitor 23 or other device within a container 21 made of metal or the like in such manner that the capacitor does not come in contact with the container. A completely reactive polymerizable composition 26 of this invention then is introduced into the container by pouring from a container or pumping through a hose in an amount sufficient to substantially fill the container and cover the capacitor. The assemblage then is placed in a baking oven and heated to cause the composition to polymerize into a solid thermoset resin.

Figure 3:
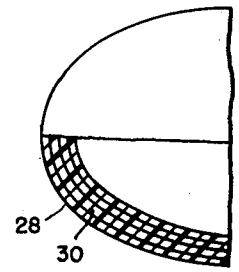
Fig. 3 is a fragmentary view, partly in cross-section, showing a laminated article such as a radome as may be used on aircraft comprising a plurality of sheets of fibrous material impregnated with a composition of this invention.

Fig. 3 shows a portion of a laminated radome installation for aircraft. The portion of the radome which is shown in cross-section is greatly enlarged with respect to the remainder of the radome in order to more clearly illustrate the laminate. The radome comprises a plurality of sheets 28 of fibrous material such as glass cloth, asbestos cloth, or the like impregnated with a composition 30 of this invention. In preparing such a laminated member, sheets of glass cloth are impregnated with a fluid polymerizable composition 30 of this invention, after which the sheets are superimposed upon one another and bonded into a laminated member by pressing the same under a weight of about 100 pounds per square inch.

Figure 4:
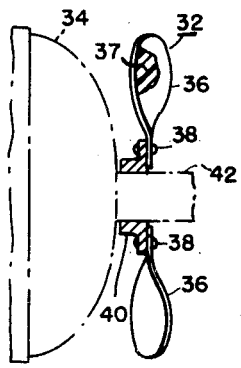
Fig. 4 is a fragmentary view, partly in cross-section, showing a motor provided with a cooling fan having blades molded from a composition of this invention.

In Fig. 4 there is illustrated a fan 32, for cooling the armature windings 34 and the like of a motor. Blades 36 of the fan 32 are molded from a composition 37 of this invention. Blades 36 are secured by rivets 38 or the like to a collar 40 which is mounted on a shaft or hub 42 of the motor. The exceptionally high thermal stability and mechanical strength characteristics of the compositions of this invention make them particularly well suited for use as molded fan blades for assemblage in motors. The compositions also may be used for molding articles such as iron handles, kitchenware and like articles where mechanical strength plus high heat stability are required. Such molded or cast articles may be formed by pouring or otherwise introducing a composition of this invention into a mold of suitable design and curing the composition to shape.

The compositions of this invention may be admixed with up to an equal amount by weight of various solid fillers such as silica, chopped glass fibers, asbestos fibers, wollastonite, powdered glass, iron oxide, titanium dioxide, clays such as bentonite, kaolin and catalpa clay, aluminum oxide, inorganic silicates, and graphite.

While the present invention has been described with reference to particular embodiments and examples, it will be understood, of course, that modifications, substitutions and the like may be made therein without departing from the true scope of the invention.

I claim as my invention:

1. A completely reactive synthetic copolymer resinous composition consisting of from 50% to 80% by weight of (A) the reaction product derived by heating to a temperature within the range of about 130° to 200° C. as sole reactants (a) an organopolysiloxane having at least two hydrolyzable hydrocarbonoxy radicals per molecule, all the other organic groups on the silicon atoms being hydrocarbon groups, said hydrocarbonoxy radicals being located on the terminal silicon atoms of the organopolysiloxane, and (b) an unsaturated polyester composition having at least as many reactive alcoholic hydroxyl groups as there are hydrolyzable hydrocarbonoxy radicals on the organopolysiloxane, said unsaturated polyester being selected from the group consisting of (1) esters obtained by reacting as sole reactants a material selected from the group consisting of isophthalic acid and terephthalic acid with an alpha-beta ethylenically unsaturated dicarboxylic acid and a polyhydric alcohol, and (2) the acid half-ester obtained by reacting as sole reactants a polyhydric alcohol ester of an hydroxylated unsaturated fatty acid with a compound selected from the group consisting of alpha-beta ethylenically unsaturated dicarboxylic acids and anhydrides thereof, said hydrolyzable hydrocarbonoxy radicals on the organopolysiloxane having reacted with said hydroxyl groups on the polyester, and from 50% to 20% by weight of (B) a liquid unsaturated reactive monomer having the group $>C=C<$.

2. A solid resinous copolymer consisting of from 50% to 80% by weight of (A) the reaction product derived by heating to a temperature within the range of about 130° to 200° C. as sole reactant (a) an organopolysiloxane having at least two hydrolyzable hydrocarbonoxy radicals per molecule and all the other organic groups attached to silicon being hydrocarbon groups, said hydrolyzable radicals being located on the terminal silicon atoms of the organopolysiloxane, and (b) an unsaturated polyester composition having at least as many reactive alcoholic hydroxyl groups as there are hydrolyzable hydrocarbonoxy radicals on the organopolysiloxane, said unsaturated polyester being selected from the group consisting of (1) esters obtained by reacting as sole reactants a material selected from the group consisting of isophthalic acid and terephthalic acid with an alpha-beta ethylenically unsaturated dicarboxylic acid and a polyhydric alcohol, and (2) the acid half-ester obtained by reacting as sole reactants a polyhydric alcohol ester of an hydroxylated unsaturated fatty acid with a compound selected from the group consisting of alpha-beta ethylenically unsaturated dicarboxylic acids and anhydrides thereof, said hydrolyzable hydrocarbonoxy radicals on the organopolysiloxane having reacted with said hydroxyl groups on the polyester, and from 50% to 20% by weight of (B) a liquid unsaturated reactive monomer having the group >C=C<, said solid resinous copolymer having been prepared by admixing (A) and (B) and heating the same in the presence of at least one vinyl addition polymerization catalyst.

3. A polymerizable resinous composition consisting of from 50% to 80% by weight of (A) the reaction product derived by heating to a temperature within the range of about 130° to 200° C. as sole reactants (a) an organopolysiloxane having at least two hydrolyzable hydrocarbonoxy radicals per molecule and all the other organic groups attached to silicon being hydrocarbon groups, said hydrolyzable radicals being located on the terminal silicon atoms of the organopolysiloxane, and (b) an unsaturated polyester composition having at least as many reactive alcoholic hydroxyl groups as there are hydrolyzable hydrocarbonoxy radicals on the organopolysiloxane, said unsaturated polyester consisting of the product obtained by reacting as sole reactants isophthalic acid and maleic anhydride with 2,2-bis-(para-hydroxyethoxyphenyl) propane, said hydrolyzable hydrocarbonoxy radicals on the organopolysiloxane having reacted with said hydroxyl groups on the polyester, and from 50% to 20% by weight of (B) monostyrene.

4. An insulated electrical member comprising an electrical conductor, solid insulation disposed upon the electrical conductor, the solid insulation having interstices therein, and a cured, solid resinous copolymer disposed within the interstices of the solid insulation and completely filling them, the cured, solid resinous copolymer consisting of the heat cured product of from 50% to 80% by weight of (A) the reaction product derived by heating to a temperature within the range of about 130° to 200° C. as sole reactants (a) an organopolysiloxane having at least two hydrolyzable hydrocarbonoxy radicals per molecule and all the other organic groups attached to silicon being hydrocarbon groups, said hydrolyzable radicals being located on the terminal silicon atoms of the organopolysiloxane, and (b) an unsaturated polyester composition containing at least as many reactive alcoholic hydroxyl groups per molecule as there are hydrolyzable hydrocarbonoxy radicals on the organopolysiloxane, said unsaturated polyester being selected from the group consisting of (1) esters obtained by reacting as sole reactants a material selected from the group consisting of isophthalic acid and terephthalic acid with an alpha-beta ethylenically unsaturated dicarboxylic acid and a polyhydric alcohol, and (2) the acid half-ester obtained by reacting as sole reactants a polyhydric alcohol ester of an hydroxylated unsaturated fatty acid with a compound selected from the group consisting of alpha-beta ethylenically unsaturated dicarboxylic acids and anhydrides thereof, said hydrolyzable hydrocarbonoxy radicals on the organopolysiloxane having reacted with said hydroxyl groups on the polyester, and from 50% to 20% by weight of (B) a liquid unsaturated reactive monomer having the group >C=C<.

5. A laminated member comprising, in combination, a plurality of layers of a fibrous sheet material and a thermoset resinous material bonding the whole, the resinous material consisting of the heat cured product of from 50% to 80% by weight of (A) the reaction product derived by heating to a temperature within the range of about 130° to 200° C. as sole reactants (a) an organopolysiloxane having at least two alkoxy groups per molecule and all the other organic groups attached to silicon being hydrocarbon groups, said alkoxy groups being located on the terminal silicon atoms of the organopolysiloxane, and (b) an unsaturated polyester composition containing at least as many reactive alcoholic hydroxyl groups as there are alkoxy groups on the organopolysiloxane, said unsaturated polyester being selected from the group consisting of (1) esters obtained by reacting as sole reactants a material selected from the group consisting of isophthalic acid and terephthalic acid with an alpha-beta ethylenically unsaturated dicarboxylic acid and a polyhydric alcohol, and (2) the acid half-ester obtained by reacting as sole reactants a polyhydric alcohol ester of an hydroxylated unsaturated fatty acid with a compound selected from the group consisting of alpha-beta ethylenically unsaturated dicarboxylic acids and anhydrides thereof, said alkoxy groups on the organopolysiloxane having reacted with the hydroxyl groups on the polyester, and from 50% to 20% by weight of (B) a liquid unsaturated reactive monomer having the group >C=C<.

6. An electrical member comprising a container having an opening therein, an electrical conductor positioned within the container and having its terminals extending through said opening, and a cured, solid resinous copolymer disposed within said container and surrounding said electrical conductor, the cured, solid resinous copolymer consisting of the heat cured product of from 50% to 80% by weight of (A) the reaction product derived by heating to a temperature within the range of about 130° to 200° C. as sole reactants (a) an organopolysiloxane having at least two alkoxy groups per molecule and all the other organic groups attached to silicon being hydrocarbon groups, said alkoxy groups being located on the terminal silicon atoms of the organopolysiloxane, and (b) an unsaturated polyester composition containing at least as many reactive alcoholic hydroxyl groups as there are alkoxy groups on the organopolysiloxane, said unsaturated polyester being selected from the groups consisting of (1) esters obtained by reacting as sole reactants a material selected from the group consisting of isophthalic acid and terephthalic acid with an alpha-beta ethyleniclly unsaturated dicarboxylic acid and a polyhydric alcohol, and (2) the acid half-ester obtained by reacting as sole reactants a polyhydric alcohol ester of an hydroxylated unsaturated fatty acid with a compound selected from the group consisting of alpha-beta ethylenically unsaturated dicarboxylic acids and anhydrides thereof, said alkoxy groups on the organopolysiloxane having reacted with the hydroxyl groups on the polyester, and from 50% to 20% by weight of (B) a liquid unsaturated reactive monomer having the group

>C=C<

References Cited in the file of this patent
UNITED STATES PATENTS

| | | |
|---|---|---|
| 2,491,409 | Kropa et al. | Dec. 13, 1949 |
| 2,584,344 | Goodwin et al. | Feb. 5, 1952 |
| 2,605,243 | Sowa | July 29, 1952 |
| 2,686,739 | Kohl | Aug. 17, 1954 |